(12) United States Patent
Fröjdh

(10) Patent No.: US 9,033,224 B2
(45) Date of Patent: May 19, 2015

(54) COMBINED RADIO-FREQUENCY IDENTIFICATION AND TOUCH INPUT FOR A TOUCH SCREEN

(71) Applicant: Neonode Inc., Santa Clara, CA (US)

(72) Inventor: Gunnar Martin Fröjdh, Dalarö (SE)

(73) Assignee: Neonode Inc., Santa Clara, CA (US)

( * ) Notice: Subject to any disclaimer, the term of this patent is extended or adjusted under 35 U.S.C. 154(b) by 10 days.

(21) Appl. No.: 14/084,595

(22) Filed: Nov. 19, 2013

(65) Prior Publication Data

US 2014/0078090 A1   Mar. 20, 2014

Related U.S. Application Data

(62) Division of application No. 13/733,862, filed on Jan. 3, 2013, now Pat. No. 8,608,066.

(60) Provisional application No. 61/584,914, filed on Jan. 10, 2012.

(51) Int. Cl.
*G06K 5/00* (2006.01)
*G06F 3/041* (2006.01)
*G06F 3/033* (2013.01)
(Continued)

(52) U.S. Cl.
CPC .............. *G06F 3/0412* (2013.01); *G06F 3/033* (2013.01); *G06F 3/041* (2013.01); *G06F 3/038* (2013.01); *G06F 3/03545* (2013.01); *G06F 21/35* (2013.01); *G06F 21/42* (2013.01)

(58) Field of Classification Search
CPC ... G06F 3/03545; G06F 3/0412; G06F 21/35; G06F 21/42; G06F 3/033; G06F 3/038; G06F 3/041; G06F 1/3215; G06F 1/3231; G06F 1/3246; G06F 21/604; G06F 21/6281; G06F 2203/0381; G06F 2203/04808; G06F 2221/2105; G06F 2221/2109; G01S 11/06; G01S 5/0252
USPC .............................. 235/380, 375, 382, 472.01
See application file for complete search history.

(56) References Cited

U.S. PATENT DOCUMENTS 5,914,709 A   6/1999   Graham et al.
7,928,965 B2  4/2011   Rosenblatt et al.
(Continued)

OTHER PUBLICATIONS

Rose, Michael, "Review: Crayola ColorStudio HD and Griffin iMarker pair up for coloring time," Jun. 5, 2011. http://www.tuaw.com/2011/06/05/review-crayola-colorstudio-hd-and-griffin-imarker-pair-up-for-c/.

*Primary Examiner* — Thien M Le
(74) *Attorney, Agent, or Firm* — Soquel Group LLC

(57) ABSTRACT

A graphics tablet system including a housing, a touch screen in the housing for receiving touch input, and for displaying graphics corresponding to the received touch input, a plurality of styli for performing touch input, each stylus including an RFID chip storing one or more graphic attributes, and a visible indicator of the one or more graphic attributes, an RFID reader in the housing for reading the stored one or more graphic attributes from a stylus touching the touch screen, and a processor in the housing, connected to the touch screen and to the RFID reader, for rendering a drawing on the touch screen according to the motion of the stylus on the touch screen and according to one or more graphic attributes read by the RFID reader from the stylus, wherein the plurality of styli store different one or more graphic attributes.

6 Claims, 5 Drawing Sheets

(51) Int. Cl.
*G06F 3/038* (2013.01)
*G06F 3/0354* (2013.01)
*G06F 21/35* (2013.01)
*G06F 21/42* (2013.01)

(56) References Cited

U.S. PATENT DOCUMENTS

| | | | |
|---|---|---|---|
| 8,089,458 B2 | 1/2012 | Barney et al. | |
| 2003/0067450 A1 | 4/2003 | Thursfield et al. | |
| 2004/0036682 A1 | 2/2004 | Zobuchi | |
| 2005/0172215 A1* | 8/2005 | Squibbs et al. | 715/500.1 |
| 2005/0184973 A1 | 8/2005 | Lum et al. | |
| 2006/0085162 A1* | 4/2006 | Bjornson et al. | 702/150 |
| 2006/0267957 A1 | 11/2006 | Kolmykov-Zotov et al. | |
| 2009/0139778 A1 | 6/2009 | Butler et al. | |
| 2010/0253468 A1 | 10/2010 | Devecka | |
| 2012/0075229 A1 | 3/2012 | Summers | |
| 2012/0262407 A1* | 10/2012 | Hinckley et al. | 345/173 |
| 2012/0299863 A1 | 11/2012 | Yilmaz | |
| 2013/0082933 A1 | 4/2013 | Liang et al. | |
| 2013/0117699 A1* | 5/2013 | Branson et al. | 715/769 |
| 2013/0176252 A1* | 7/2013 | Frojdh | 345/173 |
| 2013/0181814 A1* | 7/2013 | Smith | 340/10.1 |
| 2013/0207938 A1* | 8/2013 | Ryshtun et al. | 345/179 |
| 2013/0229333 A1* | 9/2013 | Schwartz et al. | 345/156 |
| 2015/0018015 A1* | 1/2015 | Clark et al. | 455/456.3 |

* cited by examiner

COMBINED RADIO-FREQUENCY IDENTIFICATION AND TOUCH INPUT FOR A TOUCH SCREEN

CROSS REFERENCES TO RELATED APPLICATIONS

This application claims priority benefit of U.S. Provisional Patent Application No. 61/584,914, entitled COMBINED RADIO-FREQUENCY IDENTIFICATION AND TOUCH INPUT FOR A TOUCH SCREEN, filed on Jan. 10, 2012 by inventor Gunnar Martin Fröjdh.

This application incorporates the disclosures of the following six U.S. patent applications by reference.
- U.S. application Ser. No. 12/371,609, entitled LIGHT-BASED TOUCH SCREEN, now U.S. Pat. No. 8,339,379, filed on Feb. 15, 2009 by inventors Magnus Goertz, Thomas Eriksson and Joseph Shain;
- U.S. application Ser. No. 12/486,033, entitled USER INTERFACE FOR MOBILE COMPUTER UNIT, filed on Jun. 17, 2009 by inventors Magnus Goertz and Joseph Shain;
- U.S. application Ser. No. 12/667,692, entitled SCANNING OF A TOUCH SCREEN, filed on Jan. 5, 2010 by inventor Magnus Goertz;
- U.S. application Ser. No. 12/760,567, entitled OPTICAL TOUCH SCREEN SYSTEMS USING REFLECTED LIGHT, filed on Apr. 15, 2010 by inventors Magnus Goertz, Thomas Eriksson and Joseph Shain;
- U.S. application Ser. No. 12/760,568, entitled OPTICAL TOUCH SCREEN SYSTEMS USING WIDE LIGHT BEAMS, filed on Apr. 15, 2010 by inventors Magnus Goertz, Thomas Eriksson and Joseph Shain; and
- U.S. application Ser. No. 13/424,592 entitled LIGHT-BASED FINGER GESTURE USER INTERFACE, filed on Mar. 20, 2012 by inventors Thomas Eriksson, Per Leine, Jochen Laveno Mangelsdorff, Robert Pettersson and Anders Jansson.

FIELD OF THE INVENTION

The field of the present invention is user input devices.

BACKGROUND OF THE INVENTION

Many consumer electronic devices are now being built with touch sensitive screens, for use with finger or stylus touch user inputs. Often an input includes multiple variables. For example, handwritten input may vary by color, line width and other features. In touch screen environments, each such variable is typically configured through navigating a menu or by selecting from an onscreen palette of colors or line widths. It would be advantageous to communicate this variable selection directly through the input stylus without requiring the user to navigate separately through menus or palettes. In particular, when the users are young children it is important to provide an intuitive user input experience.

In applications where user identification is important it is beneficial to provide several layers of user verification. For example, users of ATM machines match a value on their card with a PIN code in order to execute a transaction.

SUMMARY OF THE DESCRIPTION

Aspects of the present invention provide an input stylus for a touch screen, where the stylus includes a passive radio-frequency identification (RFID) tag that stores an input attribute. When the user enters touch information on the touch screen, the stored input attribute is combined with the touch input. The touch screen is thus connected to a processor that receives touch information from the touch screen when the stylus touches the touch screen. This processor is also connected to an RFID reader that reads the RFID tag input attribute when the stylus touches the touch screen. The processor associates the input attribute with the touch information.

There is thus provided in accordance with an embodiment of the present invention a graphics tablet system including a housing, a touch screen in the housing for receiving touch input, and for displaying graphics corresponding to the received touch input, a plurality of styli for performing touch input, each stylus including an RFID chip storing one or more graphic attributes, and a visible indicator of the one or more graphic attributes, an RFID reader in the housing for reading the stored one or more graphic attributes from a stylus touching the touch screen, and a processor in the housing, connected to the touch screen and to the RFID reader, for rendering a drawing on the touch screen according to the motion of the stylus on the touch screen and according to one or more graphic attributes read by the RFID reader from the stylus, wherein the plurality of styli store different one or more graphic attributes.

There is additionally provided in accordance with an embodiment of the present invention a method for a graphics tablet including detecting that a stylus is touching a touch screen, the stylus having an RFID chip, in response to the detecting, reading one or more graphic attributes from the RFID chip included in the stylus, and rendering a drawing according to the motion of the stylus on the touch screen and according to the one or more graphic attributes read from the RFID chip.

Further aspects of the present invention provide a credit or debit card for entering a personal identification number (PIN) on an automated teller machine (ATM) or sales terminal touch screen and subsequently executing an ATM operation or a sale. The touch screen is connected to a processor that receives touch information from the touch screen when the card touches the screen. The card features a passive radio-frequency identification (RFID) tag that stores user identification information, and the processor is connected to an RFID reader that reads the RFID tag user identification information when the card touches the screen. This allows the processor to check: (a) that the stored user identification information matches the entered PIN, and (b) that identical stored user identification information is received at each touch when the user keys in his PIN.

There is further provided in accordance with an embodiment of the present invention a point of sale (POS) system including a housing, a touch screen in the housing used for inputting a PIN code by tapping a sequence of keypad characters on the screen with a plastic card, wherein the plastic card has an embedded RFID chip storing a PIN code, an RFID reader in the housing configured to read the stored PIN code from the plastic card tapping the screen, and a processor in the housing, connected to the touch screen and to the RFID reader, configured to determine if the input PIN code matches the stored PIN code.

There is yet further provided in accordance with an embodiment of the present invention a method for a point of sale terminal, including reading a first PIN code that is stored in an RFID chip that is embedded in a plastic card, identifying a first keypad character on a touch sensitive display screen that is being tapped by the plastic card, reading a second PIN code that is stored in an RFID chip that is embedded in a plastic card, identifying a second keypad character on a touch sensitive display screen that is being tapped by the plastic card, determining whether the second PIN code matches the first PIN code, and if the determining is affirmative, then appending the second keypad character to the first keypad character to generate a two-character input code, else starting a new one-character input code with the second keypad character alone.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to combining input from two sources: touch input on a touch screen and radio-frequency identification (RFID) input from a passive RFID chip embedded in an object performing the touch input. Two sets of applications are described: drawing applications and banking applications. The description discloses a light-based touch screen, but the scope of the invention includes all touch technologies, inter alia, capacitive, resistive and projected capacitive, and also includes all touch surfaces, with or without an underlying display screen.

Figure 1:
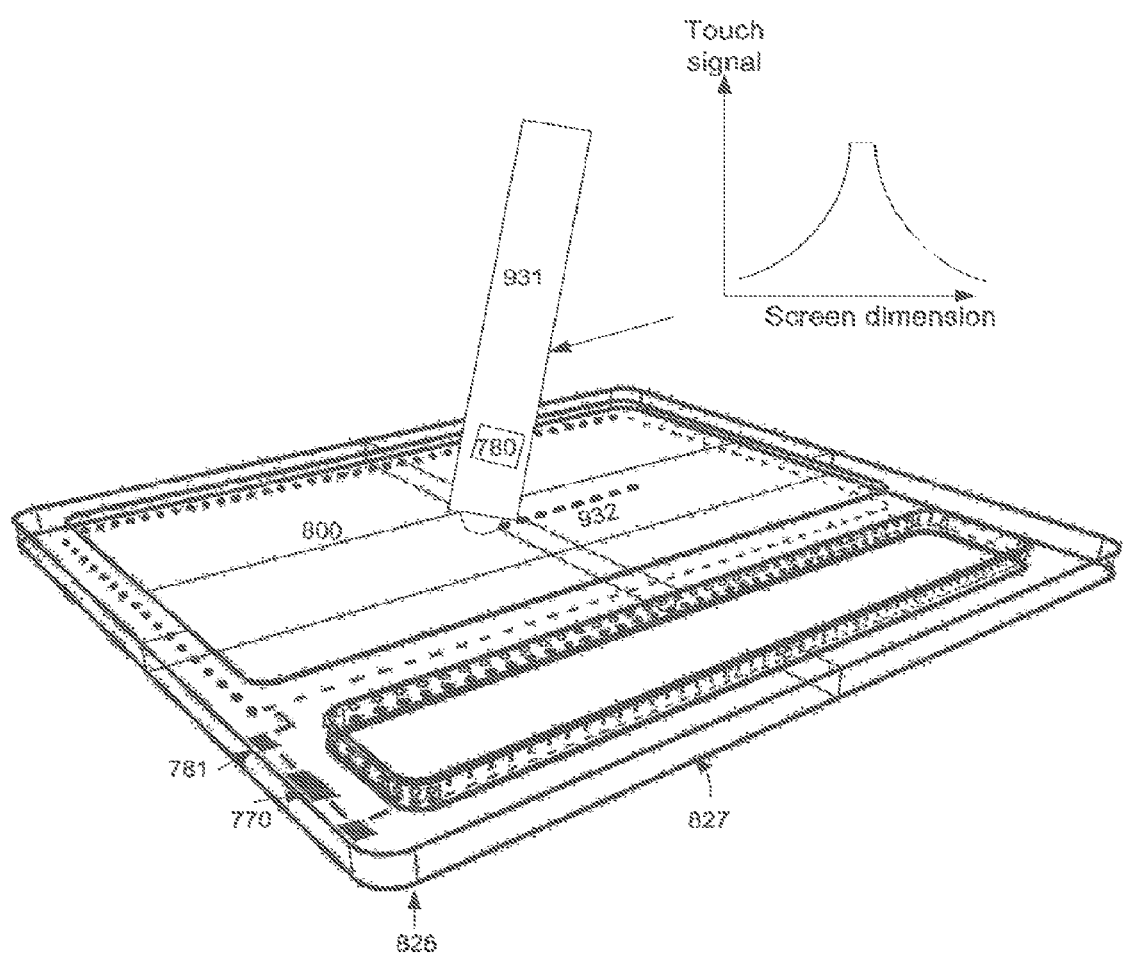
FIGS. 1-3 are simplified illustrations of input styli interacting with a touch screen, in accordance with embodiments of the present invention.
Figure 2:
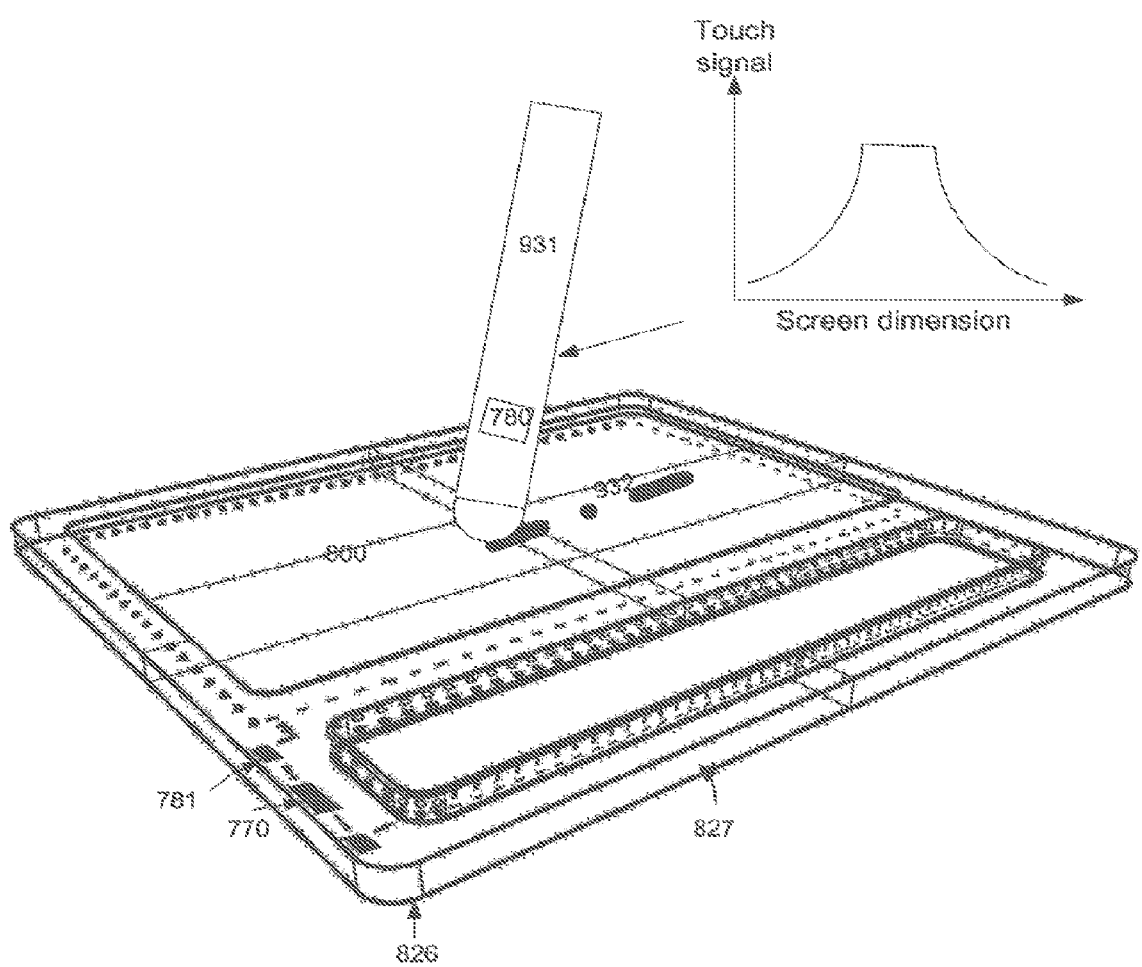
Figure 3:
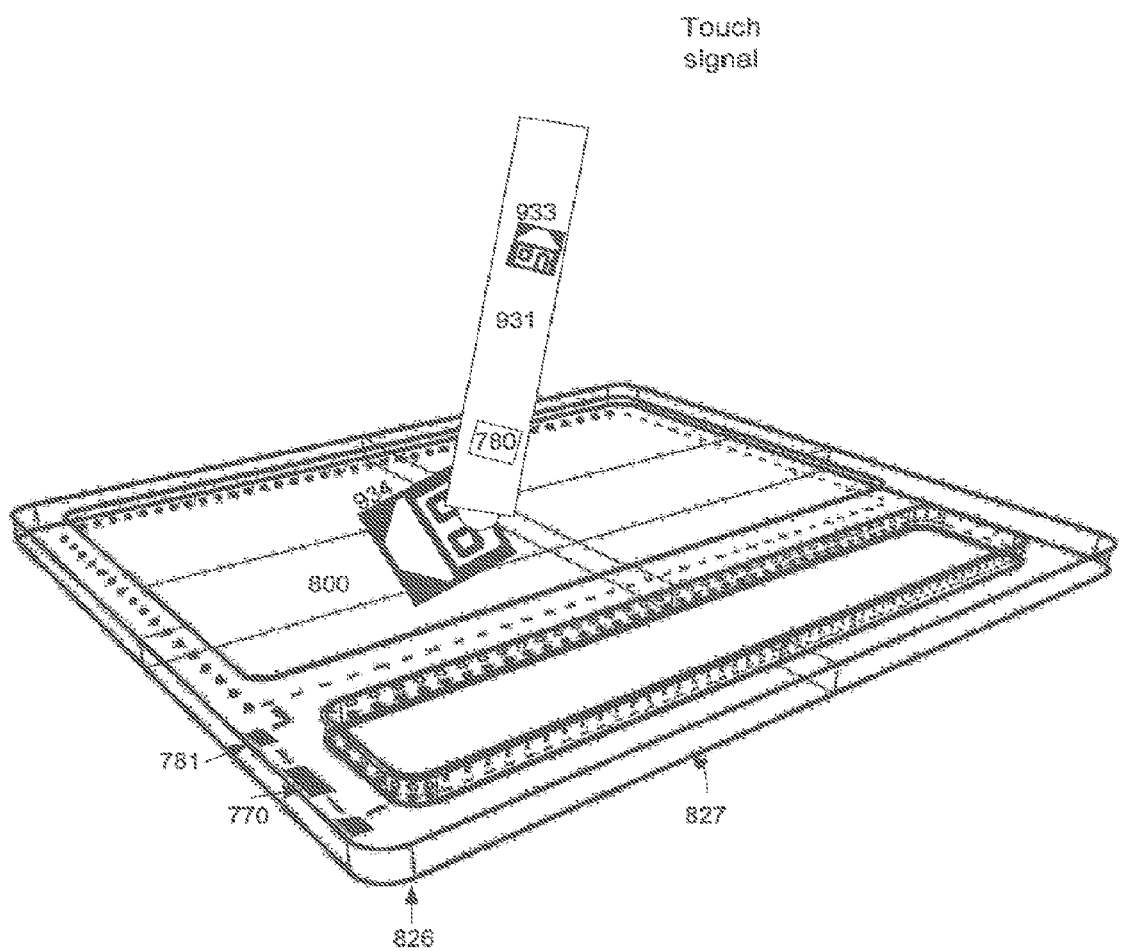

Reference is made to FIGS. 1-3, which are simplified illustrations of input styli interacting with a touch screen, in accordance with embodiments of the present invention. FIG. 1 shows an electronic device 826 encased in a housing 827, and featuring a touch-screen 800, a calculating unit 770 and an RFID reader 781. One example device is a child's drawing pad. In this case the child is provided with a variety of styli 931 fashioned as magic markers or crayons. Each provided stylus 931 draws a unique color when used on screen 800. The color associated with each stylus 931 is provided on a passive RFID tag 780 attached thereto. Passive RFID tag 780 may be embedded in the body of stylus 931 for aesthetic reasons and to prevent it from falling off the stylus. When a child draws on screen 800 with stylus 931, his strokes are communicated from touch screen 800 to calculating unit 770. When calculating unit 770 receives information that a touch has occurred, calculating unit 770 activates RFID reader 781 to read RFID tag 780. RFID reader 781 sends the read information to calculating unit 770. Calculating unit 770 combines the stroke information and the RFID information to render a line on screen 800 having attributes read from RFID tag 780. Thus, for example, stylus 931 is shown drawing red line 932. The color red is indicated by the dashed line pattern.

FIG. 2 shows electronic device 826 used with a second stylus 931 having a wider head than stylus 931 of FIG. 1. Accordingly, the drawn line 932 in FIG. 2 is wider than that of FIG. 1. Drawn line 932 in FIG. 2 is green, indicated by the dash-dot line pattern. Additional attributes of drawn lines may also be included in the RFID tag, such as a pattern, e.g., solid, dashed or dotted.

In some configurations the width of line 932 is provided together with the line color on tag 780. Alternatively, the line width is determined by the detected touch area. High resolution touch sensors, such as those described in U.S. application Ser. No. 13/424,592 entitled LIGHT-BASED FINGER GESTURE USER INTERFACE, enable determining the size of a covered area during a touch. The line width corresponds to this area. The different detected touch areas are shown in the graphs depicted in FIGS. 1 and 2. The graphs show the detection signals along one screen edge. The extent of the covered area in FIG. 1, in which stylus 931 has a narrow nib, is shorter than that of FIG. 2, in which stylus 931 has a wide nib, and this is reflected in the lengths of the detection signal peaks.

FIG. 3 shows a different configuration. Here, RFID tag 780 includes information about an image of a house. When a user touches screen 800, a house appears at the touched location. An image of a house 933 is provided on stylus 931 to indicate the resulting screen graphic 934 when the stylus is used. Additional images are provided in additional styli.

Figure 4:
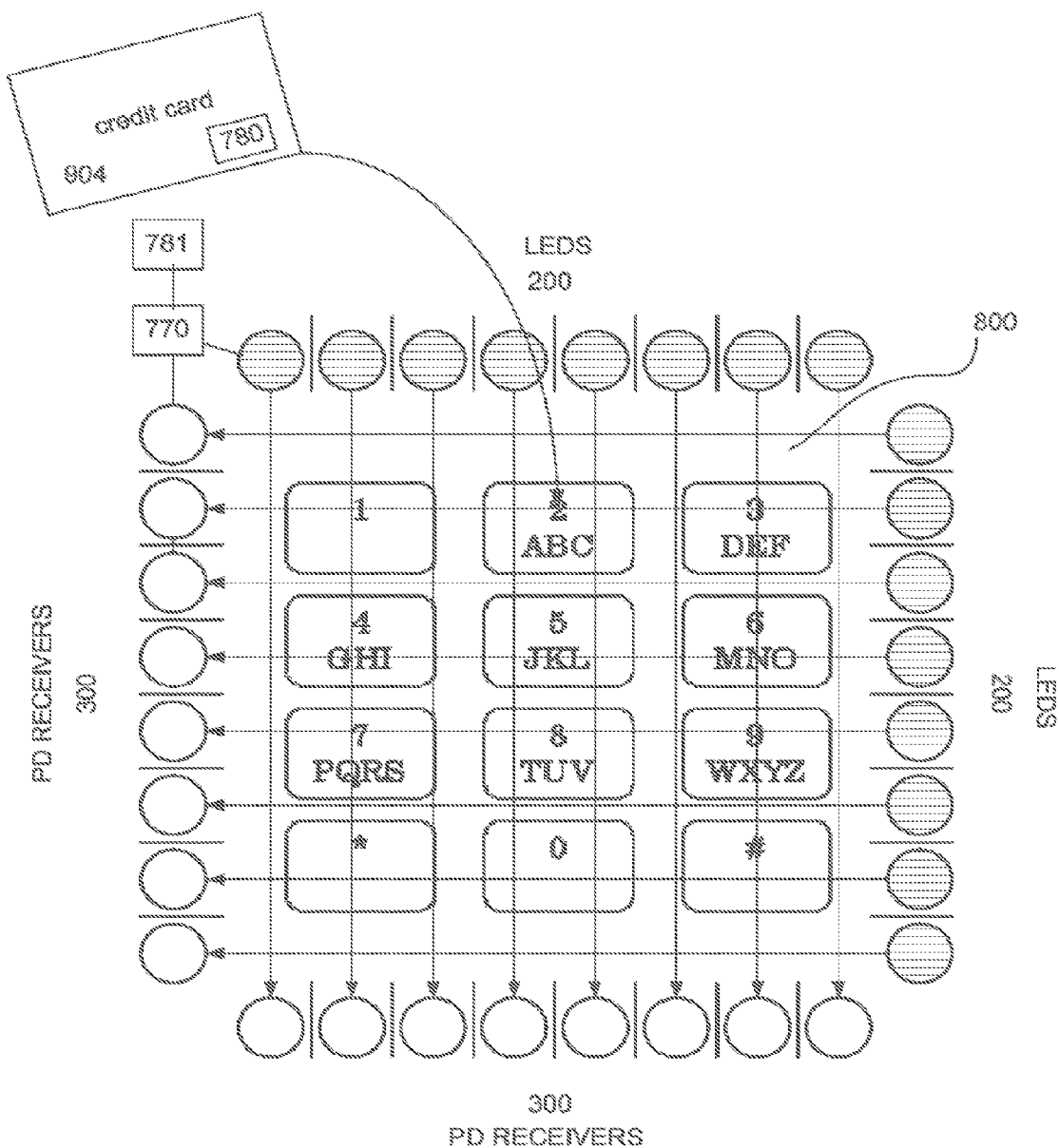
FIG. 4 is a simplified illustration of an automated teller machine (ATM) keypad and a credit card for entering a personal identification number (PIN) thereon, in accordance with an embodiment of the present invention.

Discussion now turns to banking applications. Reference is made to FIG. 4, which is a simplified illustration of an automated teller machine (ATM) keypad and a credit card for entering a personal identification number (PIN) thereon, in accordance with an embodiment of the present invention. FIG. 4 shows a light-based touch screen 800 for an ATM surrounded by rows of light emitters 200 and light receivers 300. A keypad for entering a PIN is presented. Using a credit card 904, having an embedded RFID tag 780, as a pointer, a user enters a PIN on screen 800. Every time credit card 904 touches screen 800, a touch detection signal is sent to calculating unit 770 that activates RFID reader 781 to read RFID tag 780. RFID reader 781 sends the read information to calculating unit 770. Calculating unit 770 combines the entered PIN code and the RFID information to authenticate the user. This method is explained with aid of FIG. 5.

Figure 5:
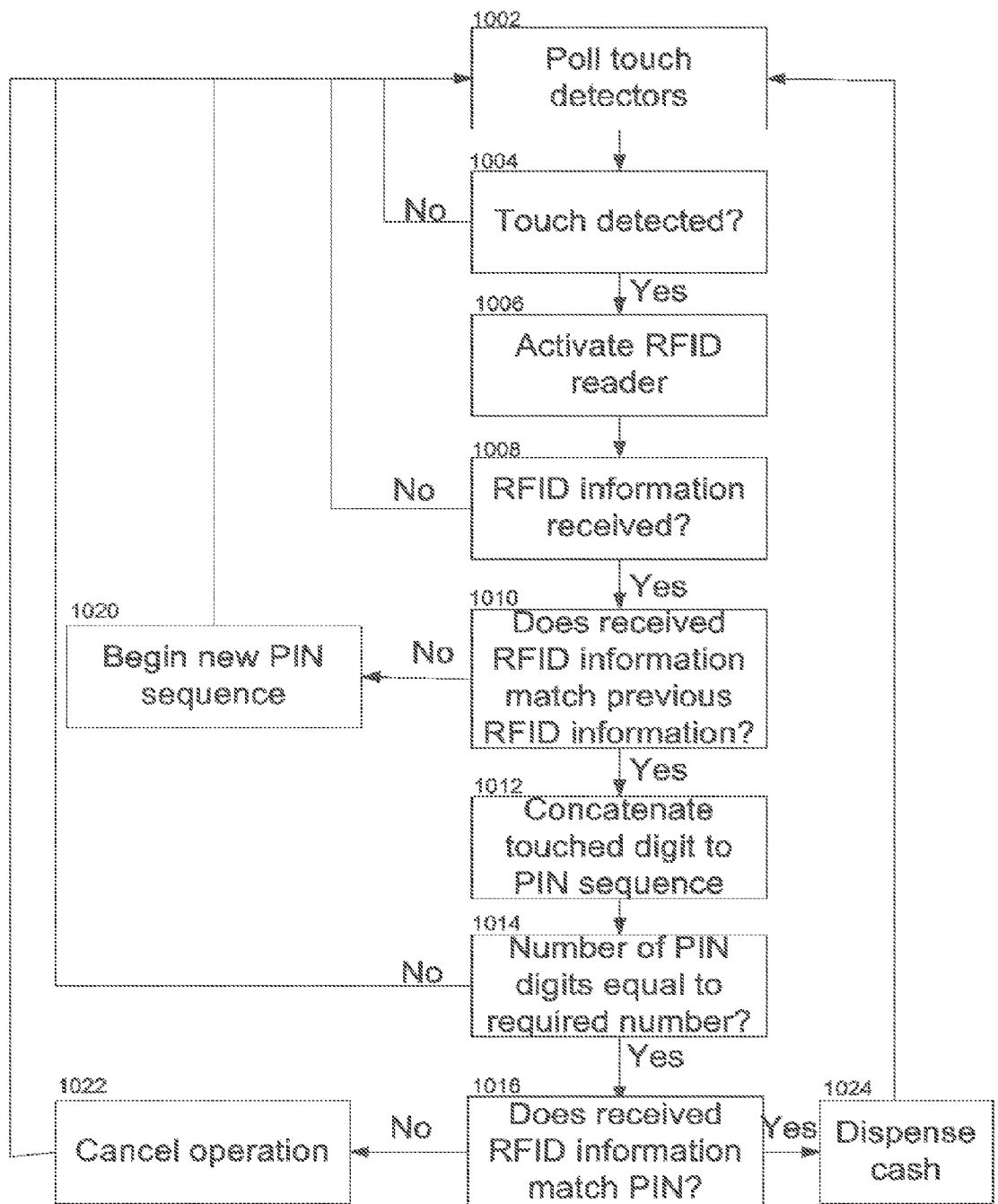
FIG. 5 is a flow chart of a user verification method on an ATM, in accordance with an embodiment of the present invention.

The method illustrated in FIG. 5 begins at step 1002 polling the touch detectors, e.g., activating emitters 200 and detecting expected light at respective emitters 300. The expected light values are sent from receivers 300 to calculating unit 770, which then determines whether a touch has occurred at step 1004. When expected light is absent a touch is assumed to have occurred. If a touch occurred, calculating unit 770 activates RFID reader 781 at step 1006 and reads RFID information therefrom. At step 1008 if no RFID information was read unit 770 ignores the touch input. If RFID information was read, unit 770 compares that input to previously stored RFID data at step 1010. The user is required to use the same object to enter each digit in the PIN. Thus, the RFID data must be identical at every touch. If the data are different, it is assumed that this is a new user. Accordingly, the previous RFID information is overwritten and the previously entered PIN digits are discarded at step 1020. If the data match, the entered PIN digit is appended to the sequence of previously entered PIN digits at step 1012. This sequence of operations continues until the expected number of PIN digits has been entered, at step 1014. At step 1016 calculating unit 770 compares the PIN entered by the user with user information read from RFID tag 780. If the data correspond to a single user, calculating unit proceeds to execute a transaction, e.g., dispense cash at step 1024. If the data do not correspond to a single user, calculating unit 770 cancels the operation at step 1022. The same method can be applied to verifying a credit card holder before execution a purchase. In this case, the touch screen is embedded in a sales console.

The invention claimed is:
1. A graphics tablet system comprising:
a housing;

a touch screen in said housing for receiving touch input, and for displaying graphics corresponding to the received touch input;

a plurality of styli for performing touch input, each stylus comprising:
- an RFID chip storing one or more graphic attributes from among the group consisting of shapes and images; and
- a visible indicator of the one or more graphic attributes;

an RFID reader in said housing for reading the stored one or more graphic attributes from a specific stylus touching said touch screen; and a processor in said housing, connected to said touch screen and to said RFID reader, for rendering a drawing on said touch screen according to a location of the specific stylus on said touch screen and according to one or more graphic attributes read by said RFID reader from the specific stylus, wherein said plurality of RFID chips store different one or more graphic attributes.

2. The graphics tablet system of claim 1, wherein said processor renders strokes in accordance with a motion of the specific stylus on said touch screen.

3. The graphics tablet system of claim 1, wherein said processor activates said RFID reader in response to an object touching said touch screen.

4. A method for a graphics tablet comprising:

detecting that a stylus is touching a touch screen, the stylus having an RFID chip;

in response to said detecting, reading one or more graphic attributes from the RFID chip included in the stylus, the attributes belonging to a group consisting of shapes and images; and rendering a drawing according to a location of the stylus on the touch screen and according to the one or more graphic attributes read from the RFID chip.

5. The method of claim 4, wherein said rendering renders strokes in accordance with a motion of the stylus on the touch screen.

6. The method of claim 4, further comprising, in response to said detecting, activating an RFID reader situated inside the tablet to perform said reading.

* * * * *